Figure 1:
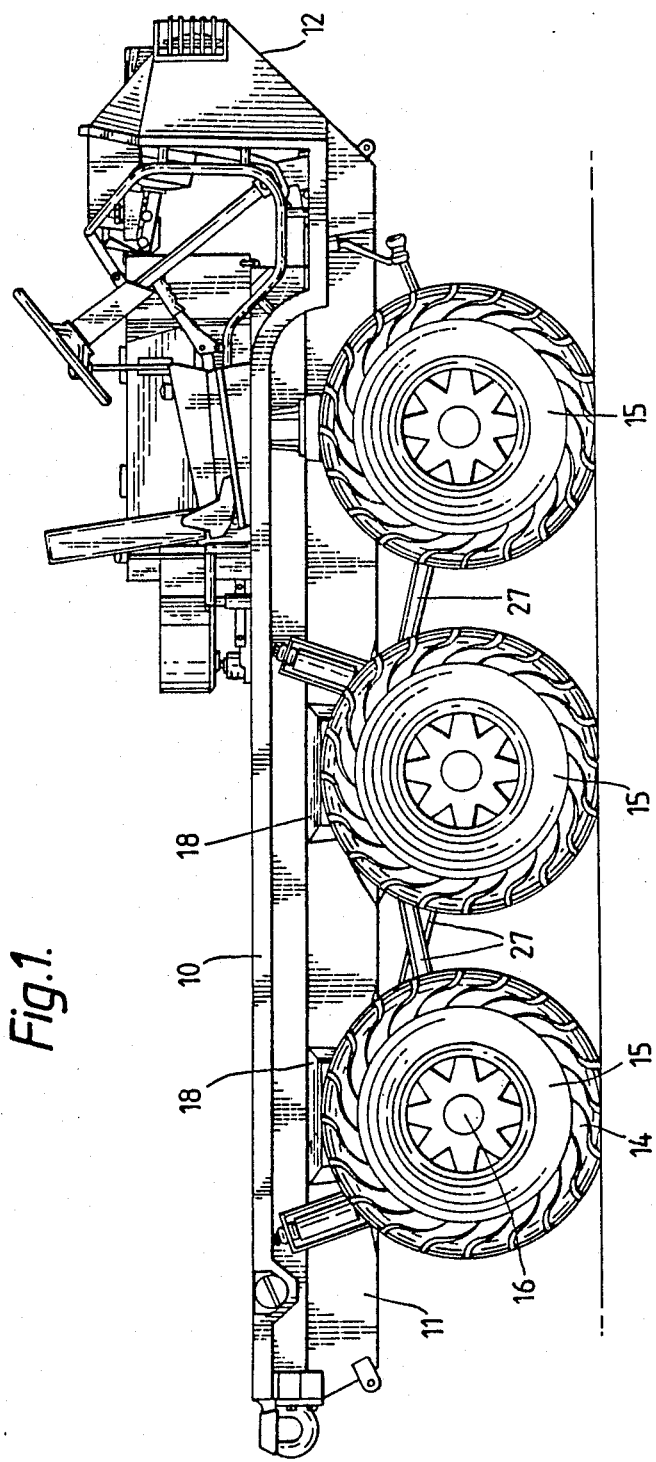

United States Patent [19]

Somerton-Rayner

[11] Patent Number: 4,821,825
[45] Date of Patent: Apr. 18, 1989

[54] ALL-TERRAIN VEHICLE

[75] Inventor: Michael Somerton-Rayner, Ludgershall, Nr. Andover, Great Britain

[73] Assignee: Escaro Limited, Great Britain

[21] Appl. No.: 45,566

[22] Filed: May 4, 1987

[30] Foreign Application Priority Data

Feb. 11, 1987 [GB] United Kingdom ............... 8703167

[51] Int. Cl.[4] ............................................. B60K 17/36
[52] U.S. Cl. .................................... 180/22; 180/24.09
[58] Field of Search ..................... 180/21, 22, 24.09; 280/685, 725; 414/537

[56] References Cited

U.S. PATENT DOCUMENTS 2,158,320 5/1939 Bock ................................. 180/24.09
4,098,414 7/1978 Abiera ................................... 414/537

FOREIGN PATENT DOCUMENTS 446783 2/1948 Canada ................................ 280/725
2252050 5/1974 Fed. Rep. of Germany ... 180/24.09
846332 6/1981 U.S.S.R. ................................... 180/22

Primary Examiner—Charles A. Marmor
Assistant Examiner—Ross Weaver
Attorney, Agent, or Firm—Shlesinger & Myers

[57] ABSTRACT

An air-portable all-terrain vehicle is provided with six wheels on three equidistant axles all driven from a single engine via two transfer boxes and differential gear units on each axle. The axles are fully floating beam axles on long travel coil springs and controlled by radius arms and Panhard rods. The radius arms may be parallel to and co-extensive with the respective propeller shafts coupling the differential gears to the transfer boxes and the connections between the propeller shafts and the transfer box outputs may include torsional vibration dampers. A dual circuit braking system with a deceleration sensing valve can be provided to limit the hydraulic pressure to the front wheel brakes. Loading-/unloading in the field is facilitated by demountable side panels serving also as loading ramps.

8 Claims, 6 Drawing Sheets

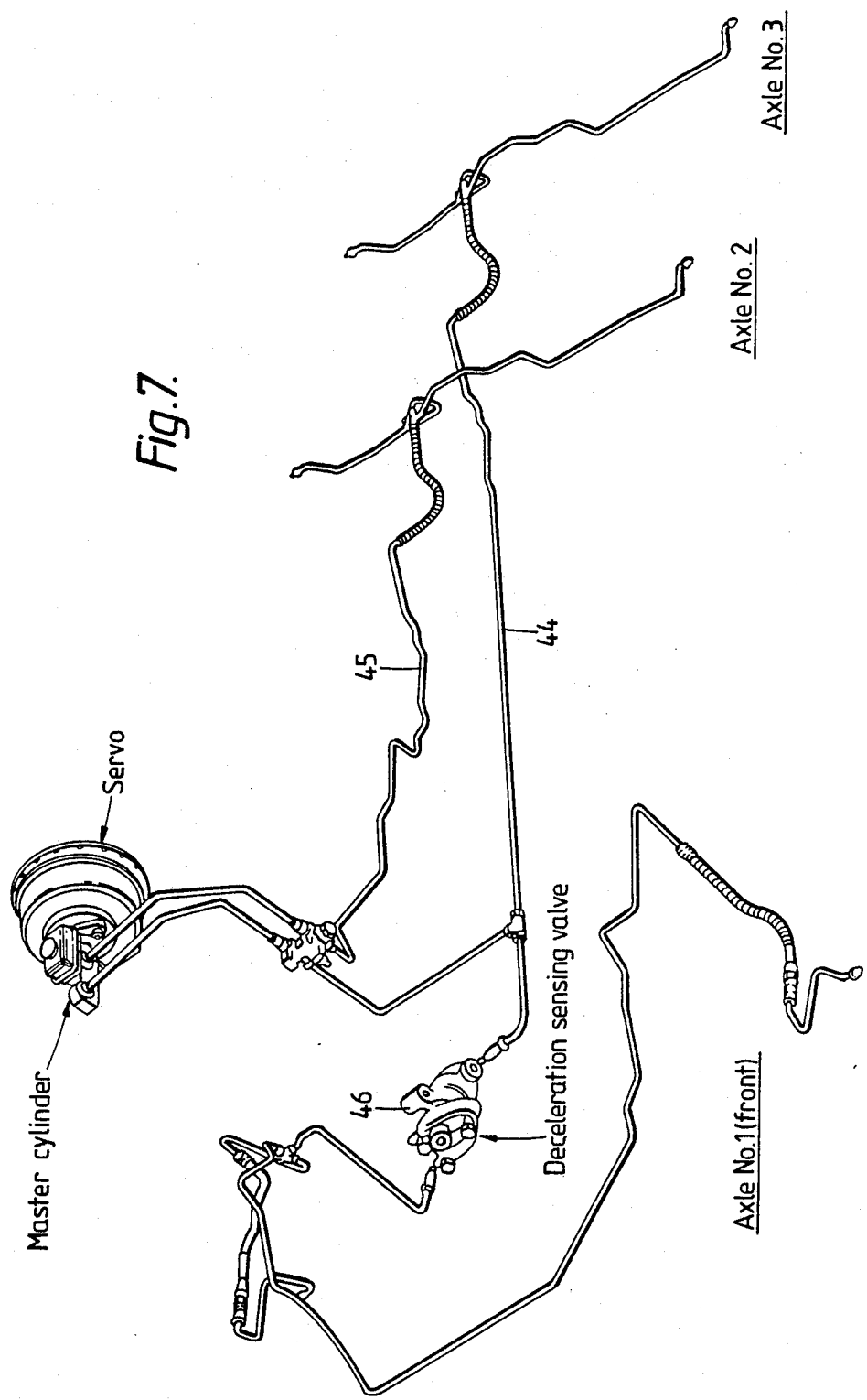

ALL-TERRAIN VEHICLE

This invention relates to all-terrain vehicles.

There is a need for a vehicle with an all-terrain capability that can act as a general purpose mobile platform, to carry either a payload or personnel, for air-dropping into a theatre of operations. Such a vehicle should preferably have the ability to cross ravines, trenches, bogs and screes, i.e. rocks spread in tumbledown fashion, and to wade through water up to a depth of, say, half a meter. It should be highly manoeuvrable with a small turning circle, for operation in close country, and capable of road running at a fairly fast speed, say up to 50 mph (80 kph). It is an object of the invention to supply this need.

According to the present invention, there is provided an all-terrain vehicle comprising a chassis with longitudinal box section members, a load platform thereon, and six low-pressure tired wheels on three equidistantly spaced axles, all three axles being driven by a single engine through two transfer boxes and respective differential gear units on all three axles, one transfer box driving the first and third axles and the other driving the second axle, and the drive from the transfer boxes to the differential gear units being transmitted by inclined propeller shafts coupled to the transfer box outputs by universal joints.

Preferably, the axles are of the beam type with fully floating axle shafts, and the suspension comprises coil suspension springs, with radius arms and Panhard rods to control the axle movements.

The coupling of each propeller shaft to the respective transfer box output may include a torsional vibration damper. The radius rods may have the same direction of slope as the respective propeller shaft, with the lower pivot of each radius rod substantially coaxial with the respective axle. Further, each radius rod may be substantially co-extensive with the respective propeller shaft, the upper pivot of the radius rod being substantially coaxial with the centre of the universal joint coupling the propeller shaft to the transfer box.

One of the problems arising in use in the field of all-terrain vehicles is that comparatively heavy or bulky loads will probably have to be on-loaded and/or off-loaded in situations where speed is of the essence, there is limited or no other equipment available and it may be impossible or undesirable to involve anyone other than the crew of the vehicle who might be only a driver. It is therefore a further object of the invention to facilitate loading of stores, supplies and equipment on to the load platform of the vehicle and likewise off-loading.

According to a further aspect of the invention, the vehicle is provided with body side panels that are designed for use also as self-loading ramps. In one form, the side panels may be arranged to be demountable from the sides of the body and hooked on to the tail of the load platform as loading ramps.

Figure 2:
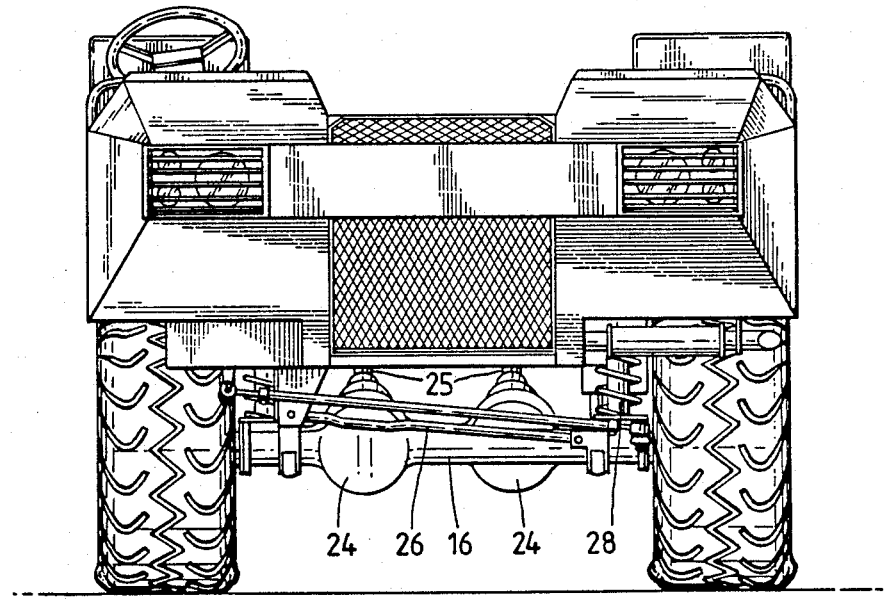
Figure 3:
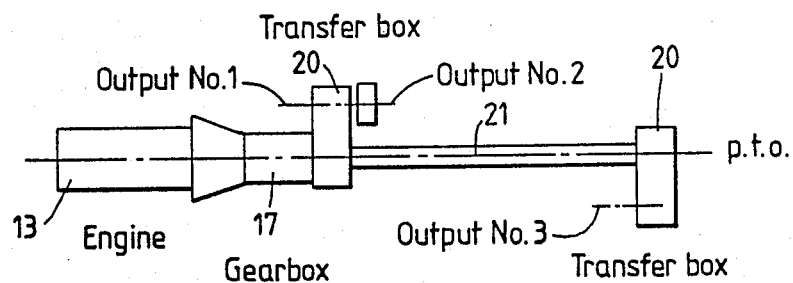
Figure 6:
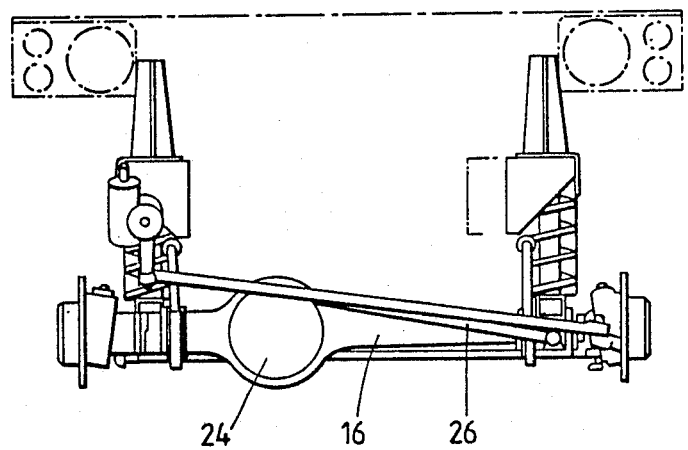
Figure 4:
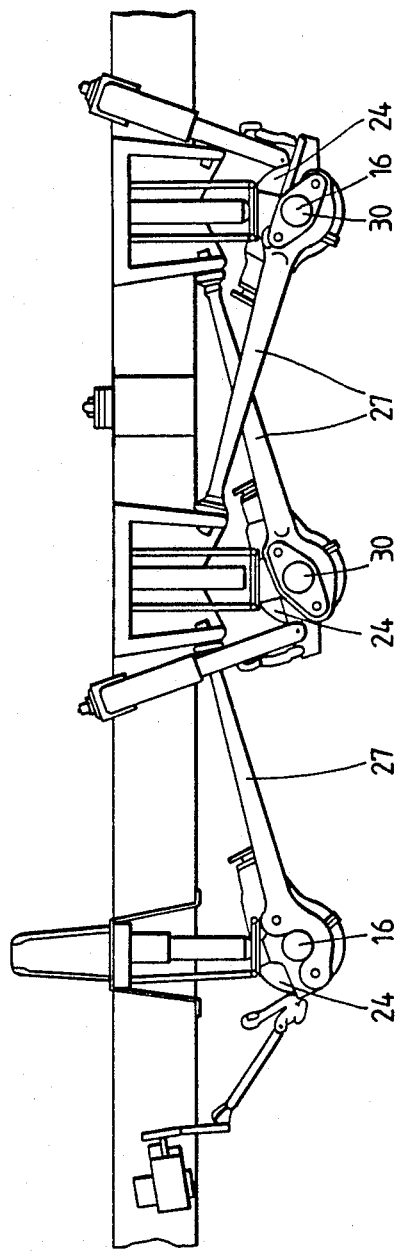
Figure 5:
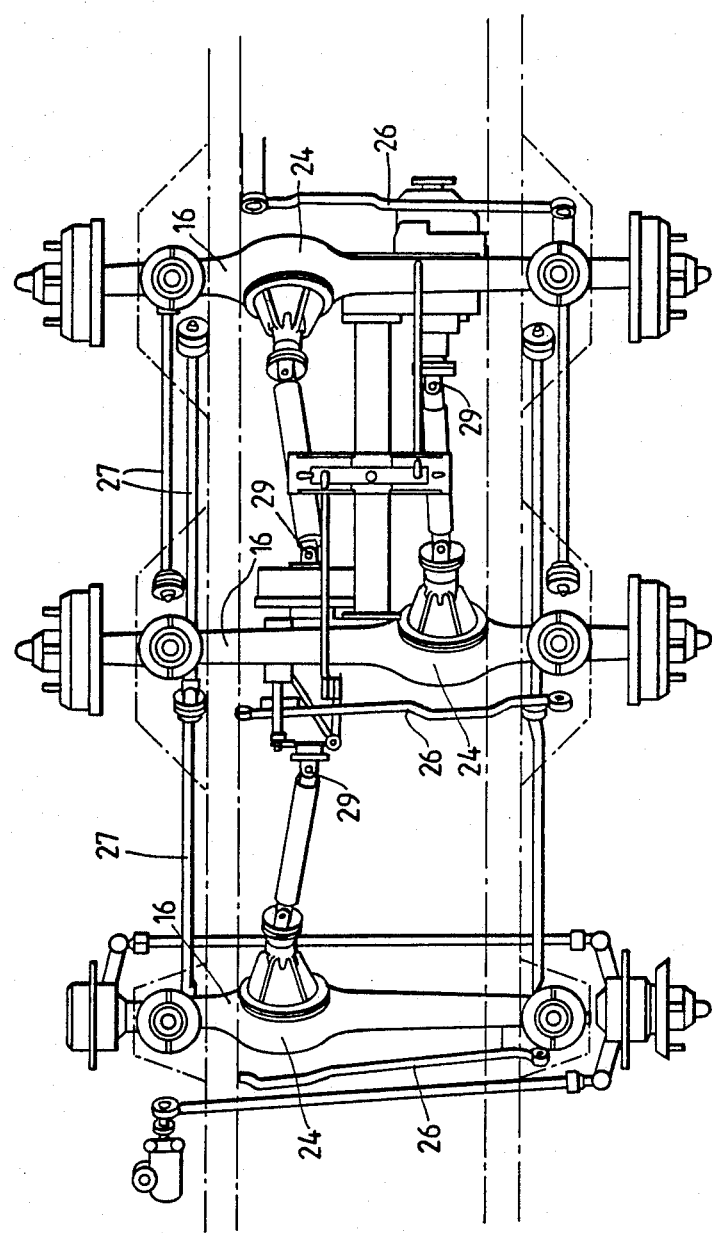

One embodiment of the invention will now be described by way of example, with reference to the accompanying drawings, in which:

FIGS. 1 and 2 are, respectively, side and front elevations of a vehicle embodying the invention, FIG. 3 is a diagrammatic side elevation of the engine and drive transmission, FIGS. 4, 5 and 6 are, respectively, a side elevation, a plan and a front elevation of the propeller shafts and suspension system, and FIG. 7 is a diagram of the braking system.

The vehicle has a chassis comprising two longitudinally-extending mild steel fabricated hollow box sections 11 joined by four cross members. Support hangers 18 for a platform hull or body 10, also of mild steel, are welded directly to this chassis to form a unitary welded structure, the whole being treated with a corrosion-resistant finish. The front of the hull structure at 12 may be strengthened to allow the vehicle to be driven through a hedge of average European density.

To the bottom of the box members 11 are welded lugs for swing axle radius rods 27 which provide independent vertical movement of the axles 16 on long travel coil springs 28, with a degree of lateral movement permitted by Panhard rods 26. The aim is to permit the use of comparatively short propeller shafts for driving the wheels and maintain the shaft universal joints within their permitted angle of operation, while providing sufficient vertical movement to the axle.

Referring now to FIGS. 3 and 5, the vehicle is powered by a water-cooled petrol or diesel engine 13 mounted at the forward end of the chassis, after which the drive is taken from a five-speed gearbox 17 through two transfer boxes 20 arranged at either end of a combined support and intermediate drive shaft 21. The drive to the three equidistantly spaced axles is transmitted from the transfer boxes to three differential drive units 24 on the axles 16 by three inclined propeller shafts 25 coupled to the outputs of the transfer boxes by universal joints 29. The axles 16 are of the beam type with spiral bevel differential gear units 24 and fully floating shafts.

The vehicle has six wheels 15 with strengthened hubs on the three axles 16, fitted with extra large balloon tires 14 to give an extremely low ground pressure. All six wheels are driven, one of the transfer boxes 20 driving the first and third axles while the other drives the second. The gaps between the wheel tires are 5 to 8 inches, giving a ramp brake over-angle of 90°. The ground pressure when fully loaded is not more than 7.8 pounds per square inch.

If desired, the universal joints can be connected to the outputs of the transfer boxes 20 by torsional vibration dampers. For this purpose, a spring-loaded clutch with radial rubber dampers can be employed. This better enables the propeller shaft assemblies to accommodate the considerable angular movements between the transfer box outputs and the differential drive units. A suitable torsional damper is that supplied as Küsel type BR154. This allows up to 15° mis-alignment of the propeller shaft at 2700 r.p.m.

Referring to FIG. 4, this shows the relationship of the inclined radius rods 27 of the suspension and the propeller shafts 25. It will be seen that the pivotal axes 30 at the lower ends 22 of the radius rods 27 are substantially coaxial with the axles 16. If desired, the pivotal axes at the upper ends of the radius rods can be substantially coaxial with the centres of the propeller shaft upper universal joints 29, making the radius rods and the propeller shafts parallel and substantially co-extensive. This maintains equality of the differential unit angles in each case throughout the vertical movement of the axle. Actuation of a lever alongside the driver's seat provides central differential locking.

The introduction of phase lagging in the relationship between the yokes of the universal joints at opposite ends of each propeller shaft is a preferred feature. Normally, it is essential that these yokes are in line with each other. However, by introducing a lag in the driven yoke of about 11° of rotation, non-linear vibration is reduced at high angles of mis-alignment, when a torsional damper is fitted as already described.

The front axle has a conventional knuckle joint for steering. The steering is power-assisted and provides a turning circle of 9 feet inner radius.

FIG. 7 shows the servo-assisted braking system, which is a double circuit hydraulic system, operating on the front and third axles through one circuit 44 and the second axle only through the second circuit 45. Additionally, a deceleration sensing valve 46 with two different diameters may be provided, if desired, to limit the hydraulic pressure in the front wheel brakes, which is variable by the amount of 'g' force applied during the deceleration of the vehicle. This ensures that the front wheels cannot lock before the wheels of the middle axle. A transmission handbrake is provided operating on the rear output shaft of the forward transfer box. A suitable deceleration sensing valve is that supplied by Girling Ltd. as their No. NRC7871.

The vehicle is designed to carry a payload of 1 tonne (1¼ to 1½ tonnes with reduced performance) over rough terrain and extremely soft ground but additionally can be used on the road, being fitted with full equipment to comply with this latter capability. It has conventional driving controls needing no special driver training. The electrical system is fully weatherproofed. With a payload, the crew provision is individual weatherproof front seats for a driver and co-driver; but eight additional bucket seats mounted on a removable frame can be fitted to the load bed platform 10 to convert the vehicle into a personnel carrier. Weather protection can also be fitted for that purpose. A roll bar can be provided which folds down for air portability or stacking.

In cross-country use, the vehicle will climb gradients of 45° and can wade to a depth of 0.5 m when fitted with a petrol engine or 0.75 m when fitted with a diesel engine. Tracks can be fitted to the rear axles and, if desired, the vehicle can be given a limited amphibious capability by the provision of floatation tanks on the hull. Power take off is available from the rear transfer box and a tow hook and wiring kit for towing are provided. A mechanical or electrical winch can be fitted.

The vehicle weighs 1400 kg and is readily air-portable under Puma and Chinook helicopters, or inside a Chinook helicopter or Hercules transport. It can be airdropped on a standard NATO pallet. To facilitate field use, the vehicle is further provided with body side panels that are designed for use also as self-loading ramps. The side panels are arranged to be demountable from the sides of the body and hooked on to the tail of the load platform as loading ramps.

I claim:

1. An all terrain vehicle, comprising:
a chassis,
an engine,
a gearbox for controlling the actuating output of the engine,
first and second transfer boxes mechanically connected to said gearbox to be capable of providing common actuating outputs therefrom,
first and second axles floating mounted to said chassis and being spaced apart at a first selected distance and a third axle being spaced apart from said second axle by a second selected distance,
first, second and third inclined propeller shafts having a length less than the selected distances including universal joints at both ends of each shaft where said shafts are connected through the universal joints respectively to said first, second and third axles and said first and third shafts are connected to said first transfer box and said second shaft is connected to said second transfer box, and
swing axle radius rods, each connected to one of said axles and to said chassis to provide independent vertical movement of each of said axles relative to said chassis.

2. A vehicle according to claim 1, wherein the axles are of the beam type with fully floating axle shafts, and further including suspension means comprising coil suspension springs associated with said radius arms and Panchard rods to control the lateral movement of each of said axles.

3. A vehicle according to claim 1 or claim 2, wherein the coupling of each propeller shaft to the respective transfer box output includes a torsional vibration damper.

4. A vehicle according to claim 3, wherein the radius rods for each axle have the same direction of slope as the respective propeller shaft, and where each radius rod has a lower pivot substantially coaxial with the respective axle and the axles each include low pressure tires.

5. A vehicle according to claim 4, wherein each radius rod is substantially parallel to and substantially coextensive with the respective propeller shaft, the upper pivot of the radius rod being substantially coaxial with the center of the universal joint coupling the propeller shaft to the transfer box.

6. A vehicle according to claim 2 or claim 4 having a braking system featuring a double circuit hydraulic system, operating on the first and third axles through one circuit and the second axle only through the second circuit.

7. A vehicle according to claim 6, wherein the braking system incorporates a deceleration sensing valve brakes.

8. A vehicle according to claim 1 having, demountable body side panels that are adapted to be hooked on to the tail of the load platform as loading ramps.

* * * * *

UNITED STATES PATENT AND TRADEMARK OFFICE
CERTIFICATE OF CORRECTION

PATENT NO. : 4,821,825
DATED : April 18, 1989
INVENTOR(S) : Somerton-Rayner

It is certified that error appears in the above-identified patent and that said Letters Patent is hereby corrected as shown below:

Title page, item [73]: change the name of the assignee from "Escaro Limited" to --Esarco Limited--.

Signed and Sealed this

Eighth Day of January, 1991

*Attest:*

HARRY F. MANBECK, JR.

*Attesting Officer*      *Commissioner of Patents and Trademarks*